United States Patent [19]

Siemon et al.

[11] Patent Number: 4,913,663

[45] Date of Patent: Apr. 3, 1990

[54] COMBINED TRANSIENT VOLTAGE AND SNEAK CURRENT PROTECTOR

[75] Inventors: John A. Siemon, Watertown; Howard Reynolds, Waterbury, both of Conn.

[73] Assignee: The Siemon Company, Watertown, Conn.

[21] Appl. No.: 319,489

[22] Filed: Mar. 6, 1989

Related U.S. Application Data

[62] Division of Ser. No. 190,180, May 4, 1988.

[51] Int. Cl.⁴ .............................................. H01R 31/08
[52] U.S. Cl. .................................... 439/509; 439/507; 439/510; 439/511; 439/512
[58] Field of Search ................. 439/386, 507, 509-512, 439/603, 719

[56] References Cited

U.S. PATENT DOCUMENTS

| | | | |
|---|---|---|---|
| 4,029,376 | 6/1977 | Headington et al. | 439/510 |
| 4,602,834 | 7/1986 | Hahn et al. | 439/510 |
| 4,607,899 | 8/1986 | Romine et al. | 439/512 |

Primary Examiner—Steven C. Bishop
Attorney, Agent, or Firm—Fishman, Dionne & Cantor

[57] ABSTRACT

A combined transient voltage and sneak current protector is presented. The protector device comprises a two-piece substantially rectangular insulative housing. The housing has four spaced and aligned openings at the bottom thereof for receiving upstanding terminals from a terminal block. The interior of the housing is loaded with four contact members which are adapted to effect electrical connection with a three element surge suppressor (e.g. transistor) and a pair of small cylindrical fuse elements. Each of the four contact members include a female connector communicating with the four aligned openings in the housing. The housing interior also includes a ground contact which electrically connects to the middle element on the surge suppressor. The ground contact passes through a lateral opening in the housing for mating with a novel plug-on grounding bus connector.

5 Claims, 9 Drawing Sheets

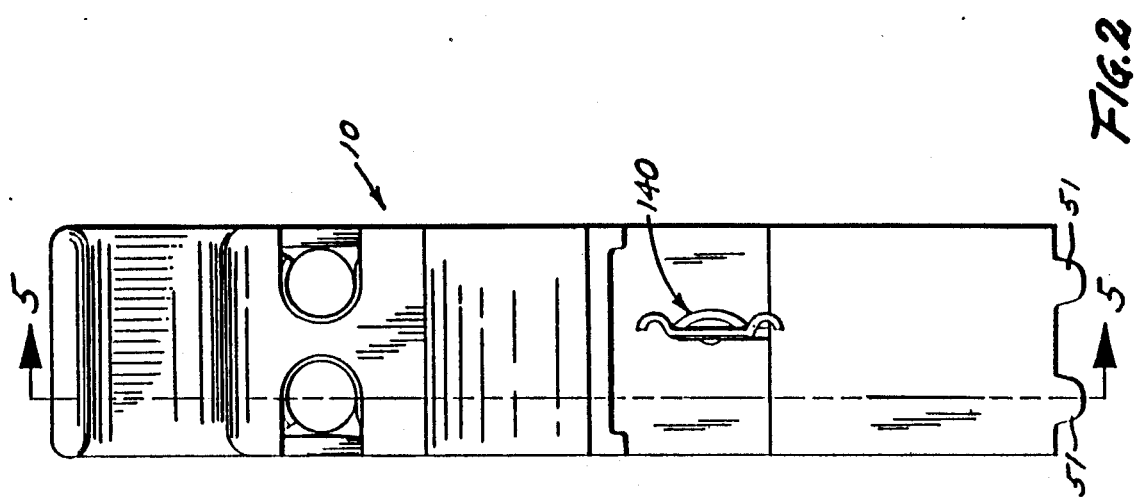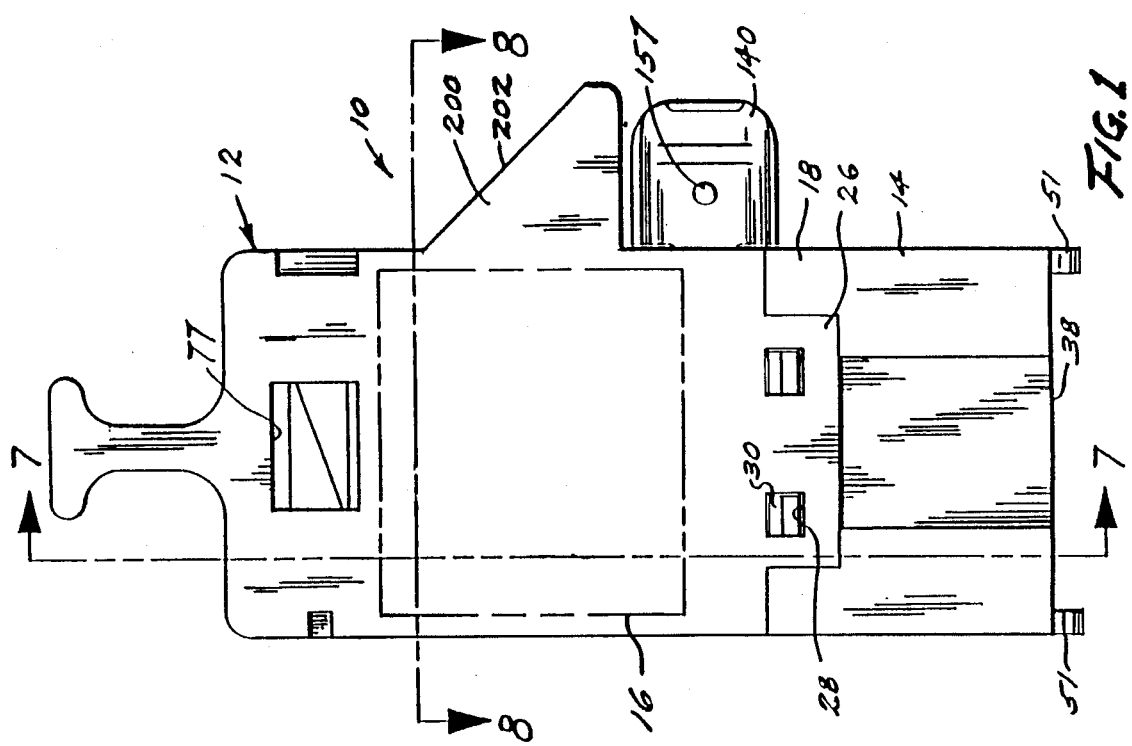

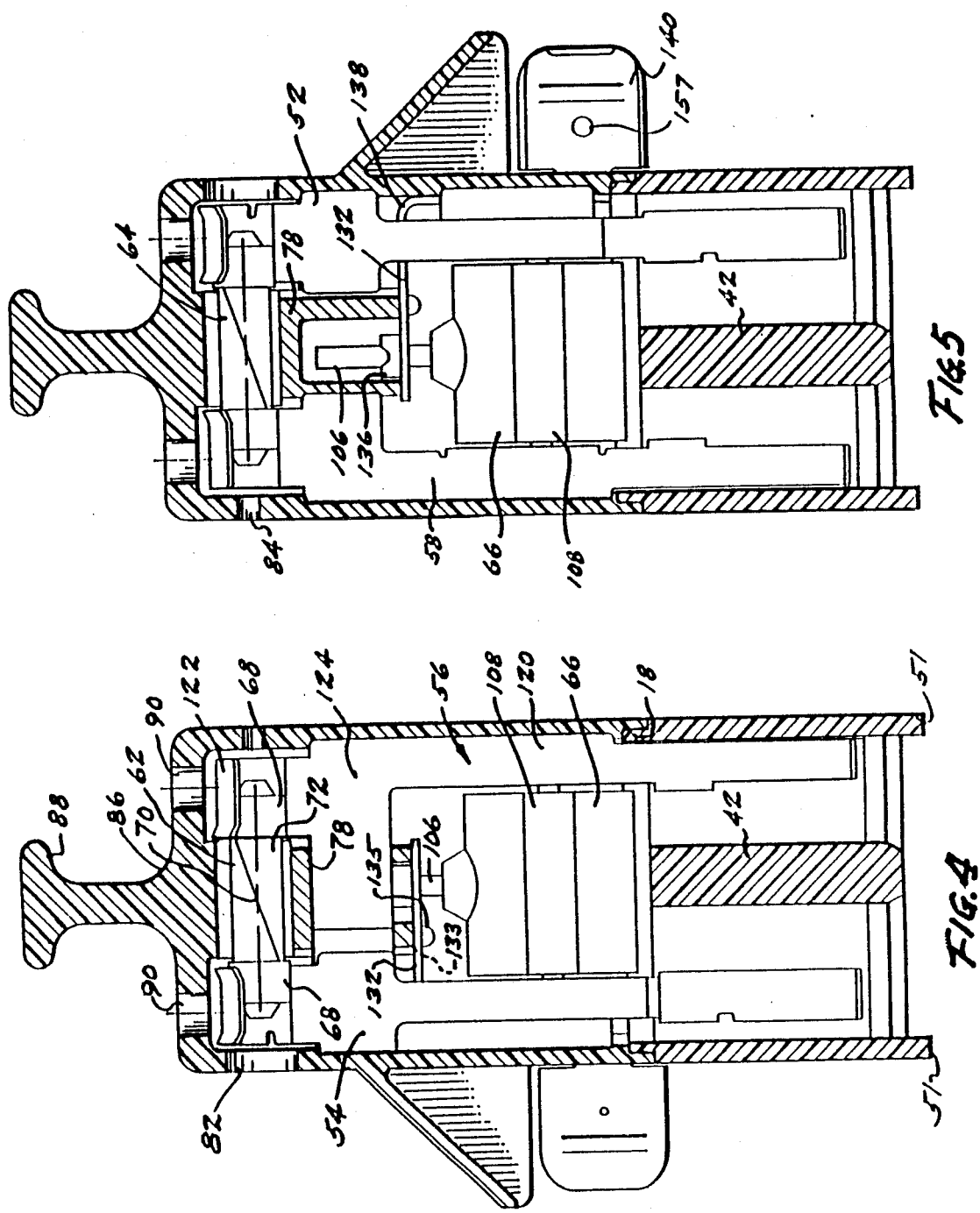

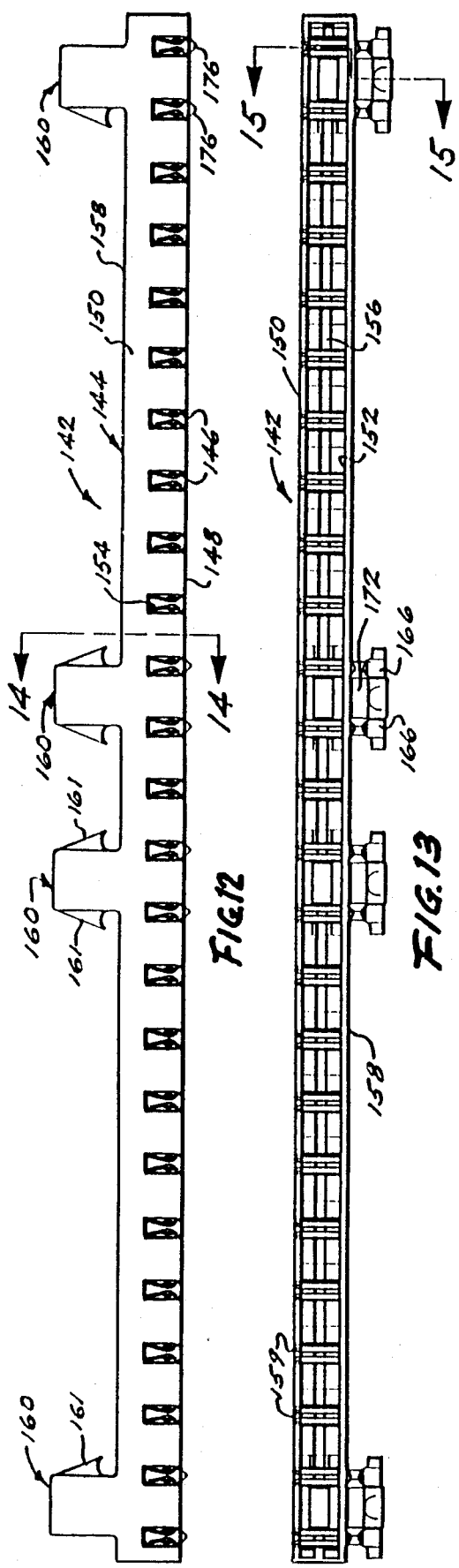

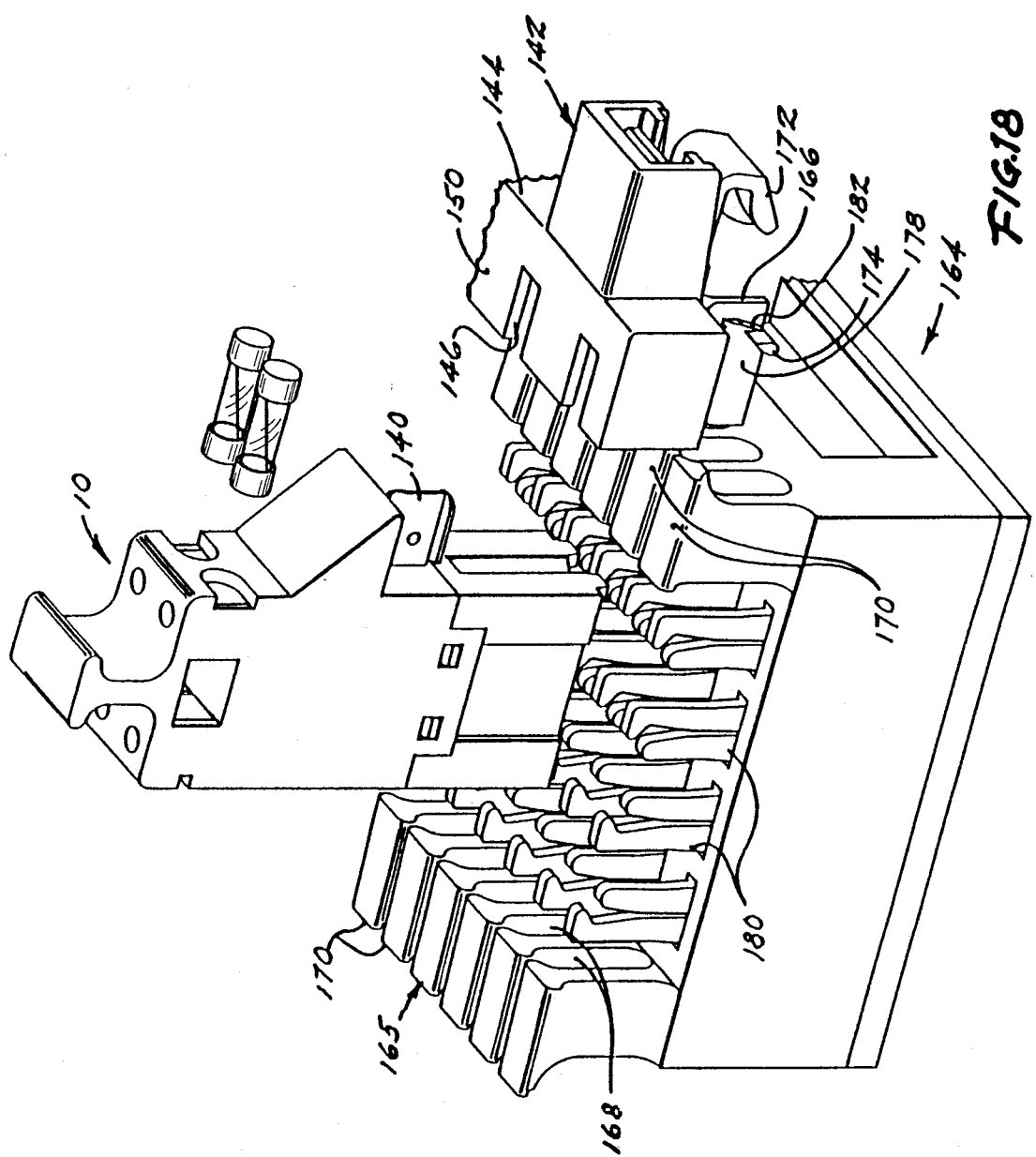

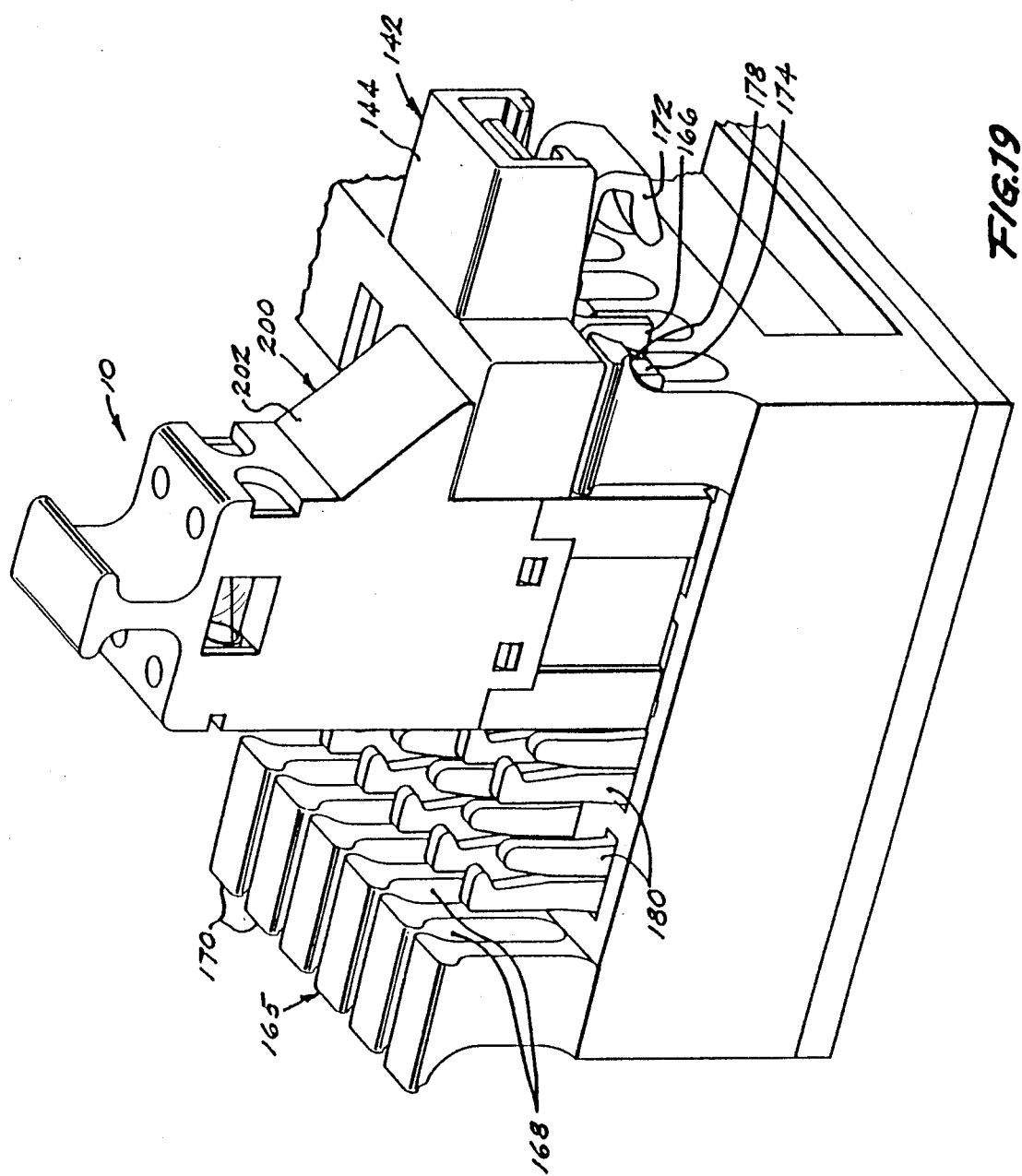

COMBINED TRANSIENT VOLTAGE AND SNEAK CURRENT PROTECTOR

This is a continuation of co-pending application Ser. No. 190,180 filed on May 4, 1988.

BACKGROUND OF THE INVENTION

This invention relates generally to telephone line protector devices. More particularly, this invention relates to a new and improved telephone line protector device which incorporates protection against both transient voltages and high current fluctuations. The protective device is adapted to be insertable directly onto terminals extending upwardly from a terminal block.

Telephone and communications terminal blocks having a plurality of individual finger-like terminals extending therefrom, such as the well known 66-type connector blocks, connect equipment which requires protection from damaging high voltages and current levels. For many years, protective devices utilizing gas tube or carbon mechanisms have been used to protect telephone circuitry from high voltage and current damage. Such "primary" protective devices are located at the juncture between the outside telephone lines and the lines leading into the building known as outside plant (OSP).

Even with the use of primary voltage protective devices, the leading edge of a voltage spike from a lightning strike, by a momentary contact with a high voltage line or by other causes, will pass through the primary device due to the inherent delay in the gas tube or carbon protector. As the nature of telephone switching equipment shifts from the mechanical relay type to electronic and as sensitive computer equipment is added to the communications network, it is increasingly desirable to protect low voltage telephone and data circuits from high transient voltages at the terminal blocks wherein connections are made between the primary protective devices and equipment inside the building protective devices of this type are known as "secondary" protectors. A secondary device is used with the primary protector as a second line of defense against any surge currents or transient voltage spikes that pass through the primary protection. Also, the secondary device is located as close as possible to the equipment connection point such that any transients generated between building entrance and the main distribution point are clamped as well.

Such "secondary" protective devices are known which include electrical components for protecting against high transient voltages and which plug directly onto the terminals of a terminal block. Examples of plug-on transient voltage protectors are disclosed in U.S. Pat. Nos. 4,113,340, 4,116,524, 4,126,369, 4,554,609 and 4,654,743.

Discrete devices have also been utilized to protect telephone circuits from high currents (as opposed to high voltages) which manage to pass through the "primary" protection. These secondary protectors are known as "sneak current protectors". An early sneak current protector manufactured by Western Electric Company is known in the communications field as a type 60D fuse. The 60D fuse is a relatively large and bulky fuse which attaches to the fanning strip of a 66 M type connecting block When attached, the 60D fuse both extends laterally from the block and above the top of the block. As a result, the use of this fuse precludes efficient terminal block spacing and the use of block covers. In addition, the type 60D fuse necessitates intricate and time consuming handwiring.

U.S. Pats. Nos. 4,126,369 and 4,447,105 disclose an improved sneak current protector which is installed directly onto adjacent terminals of a 66 type terminal block. However, there are several important disadvantages and drawbacks to this device. For example, these sneak current protectors may comprise a rectangular housing having a relatively large cylindrical attachment (housing a fuse) attached to one side of the housing and extending upwardly from the housing. The presence of the bulky cylinder necessitates alternate mounting of the devices, precludes side to side stacking and precludes the use of a cover. Moreover, the unit is relatively difficult to assemble and install due to its multiplicity of parts, all of which leads to higher manufacturing and installation costs. Also, when the fuse breaks, the entire unit must be discarded and replaced.

An improved sneak current protector specifically adapted for plugging directly to a terminal block is disclosed in U.S. Application Ser. No. 115,531 filed Oct. 30, 1987, assigned to the assignee hereof, all of the contents of which are incorporated herein by reference. This improved sneak current protector comprises a plastic housing which incorporates a pair of small, easily replaceable cylindrical fuse elements.

Notwithstanding the above-mentioned prior art protective devices, there continues to be a need for improved economical plug-on protectors which combine protection from both damaging transient voltages and current overloads.

SUMMARY OF THE INVENTION

The above-discussed and other problems and deficiencies of the prior art are overcome or alleviated by the combined transient voltage and sneak current protector of the present invention. In accordance with the present invention, the protector device comprises a two-piece substantially rectangular insulative housing. The housing has four spaced and aligned openings at the bottom thereof for receiving upstanding terminals from a terminal block. The interior of the housing is loaded with four contact members which are adapted to effect electrical connection with a three element surge suppressor (e.g. transistor) and a pair of small cylindrical fuse elements. Each of the four contact members include a female connector communicating with the four aligned openings in the housing. The housing interior also includes a ground contact which electrically connects to the middle element on the surge suppressor. The ground contact passes through a lateral opening in the housing for mating with a novel plug-on grounding bus connector or well known discrete wire termination means such as female crimp type terminals.

The protective device of the present invention includes many features and advantages over prior art plug-on protective devices for telephone terminal blocks such as the well known 66 type connector block For example, unlike the prior art devices, the present invention combines both high speed transient voltage and sneak current protection in a single plug-on unit.

Also, the present invention utilizes a three element voltage surge suppressor (e.g. transistor) rather than a two element device as is commonly found in prior art protectors. It will be appreciated that better line balance (voltage differential between tip and ring is minimized)

is achieved with three rather than two element suppressors.

The plug-on bus bar ground connector permits the connection of all the ground contacts simultaneously instead of individually as in the screw-on prior art devices such as disclosed in U.S Pat. No. 4,554,609. The bus bar ground also permits access from above the terminal block so that individual protector units may be removed for servicing without disturbing adjacent lines.

The above-discussed and other features and advantages of the present invention will be appreciated and understood by a person of ordinary skill in the art from the following detailed description and drawings.

BRIEF DESCRIPTION OF THE DRAWINGS

Referring now to the drawings, wherein like elements are numbered alike in the several FIGURES:

FIG. 1 is a front elevation view of the combined transient voltages and sneak current protector of the present invention;

FIG. 2 is a side elevation view of the protector of FIG. 1;

FIG. 4 is an elevation view, partly in cross section, along the line 4—4 of FIG. 3;

FIG. 5 is an elevation view, partly in cross section, along the line 5—5 of FIG. 2;

FIG. 12 is a plan view of the grounding bus connector used with the protector of FIG. 1;

FIG. 13 is a side elevation view of the bus connector of FIG. 12;

FIG. 14 is a cross-sectional elevation view along the line 14—14 of FIG. 12;

FIG. 15 is a cross-sectional elevation view along the line 15—15 of FIG. 13;

FIG. 18 is an exploded perspective view of the protective device and grounding bus connector of the present invention prior to connection to a terminal block; and FIG. 19 is a perspective view of the components of FIG. 18 subsequent to assembly on a terminal block.

DESCRIPTION OF THE PREFERRED EMBODIMENT

Figure 3:
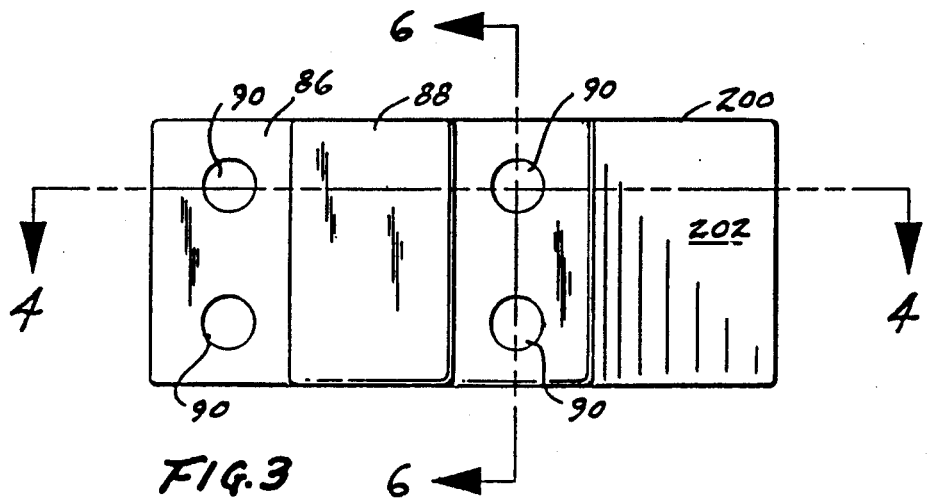
FIG. 3 is a plan view of the protector of FIG. 1.
Figure 8:
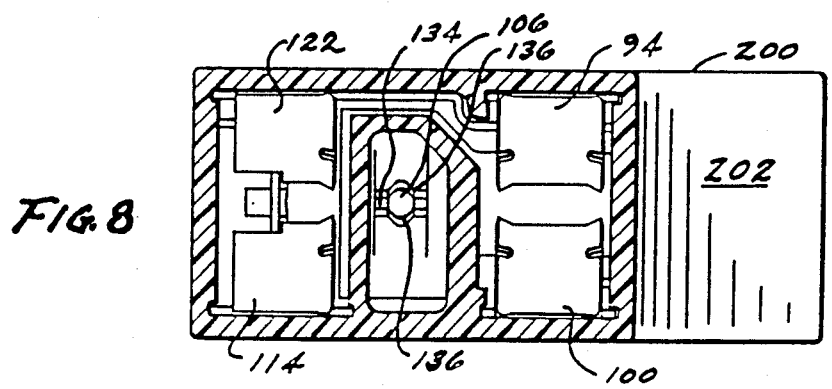
FIG. 8 is an elevation view, partly in cross section, along the line 8—8 of FIG. 1.

Referring simultaneously to FIGS. 1-10, a combined transient voltage and sneak current protector in accordance with the present invention is shown generally at 10. Protector 10 comprises an insulative, preferably plastic molded housing 12. Housing 12 is substantially rectangular and comprises two pieces including a lower nose section 14 and an upper section 16. Lower section 14 includes an upper portion 18 of lesser wall thickness which defines a shoulder 20. Similarly, upper section 16 includes a lower portion 22 having a shoulder 24. During assembly, upper portion 18 is received within lower portion 22 so that shoulder 20 of housing section 14 bears up against lower portion 22 of housing section 16; and shoulder 24 of housing section 16 bears up against upper portion 18 of housing section 14.

Upper housing section 16 also includes a pair of opposed depending lips 26 (see FIG. 1) having spaced, aligned openings 28 therethrough. Openings 28 are sized to receive corresponding detents 30 positioned in upper portion 18 of housing section 14 so that upon assembly of the two housing sections 14 and 16, lips 26 will flex outwardly slightly and then snap inwardly as openings 28 are aligned with detents 30 to effect a strong attachment therebetween.

Housing section 14 includes four spaced and mutually aligned openings 30, 32, 34 and 36 on the bottom surface 38 which provides communication between the exterior and interior of housing 12. Each of the openings 30, 32, 34 and 36 include a ramped lead-in area to facilitate receipt of an upstanding terminal from a terminal block (see FIGS. 18 and 19). Each opening in bottom surface 38 also leads to a discrete cavity defined by transverse walls 40 and 42 and identified as lower cavities 44, 46, 48 and 50 (see FIGS. 4-7). Bottom surface 38 of housing section 14 also includes four depending spacer members 51 which act to space protector 10 off the bottom of a terminal block subsequent to attachment.

The interior of housing 12 includes eight separate components including a pair of identical line contacts 52 and 54, a pair of differently configured load contacts 56 and 58, a ground contact 60, a pair of small cylindrical fuse elements 62 and 64 and a three element voltage surge suppressor 66.

Cylindrical fuse elements 62 and 64 are of the type disclosed in previously discussed U.S. Pat. Application Ser. No. 115,531 and includes opposed conductive end terminations 68 interconnected by a thin metal filament 70 encased in a cylindrical glass housing 72. Fuse elements 62, 64 are supported in discrete upper cavities 74, 76, respectively defined by transverse bottom wall 78 and side wall 80. Fuse elements 62, 64 are loaded in respective cavities 74, 76 through appropriately sized openings 82 in housing 16. In addition, openings 84 of smaller diameter are provided to cavities 74, 76 for insertion of a rod which will push each fuse out of housing 16 through larger openings 82 in the event fuse elements 62, 64 need to be replaced. Windows 77 are provided through opposed sides of housing 12 to assist the user in determining whether the fuse element is operational.

The top surface 86 of housing 12 includes a handle 88 for assisting in the insertion and retraction of the present invention onto a terminal block. Four aligned apertures 90 are provided through top surface for communication between both ends of the fuse elements 62 and 64 in each respective cavity 74, 76 and a test probe.

Figure 6:
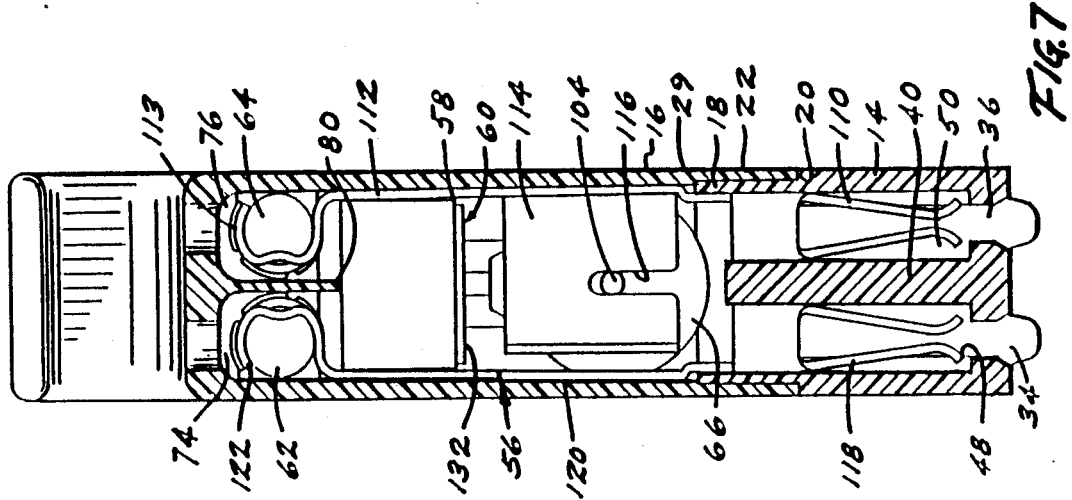
FIG. 6 is an elevation view, partly in cross section, along the line 6—6 of FIG. 3.
Figure 7:
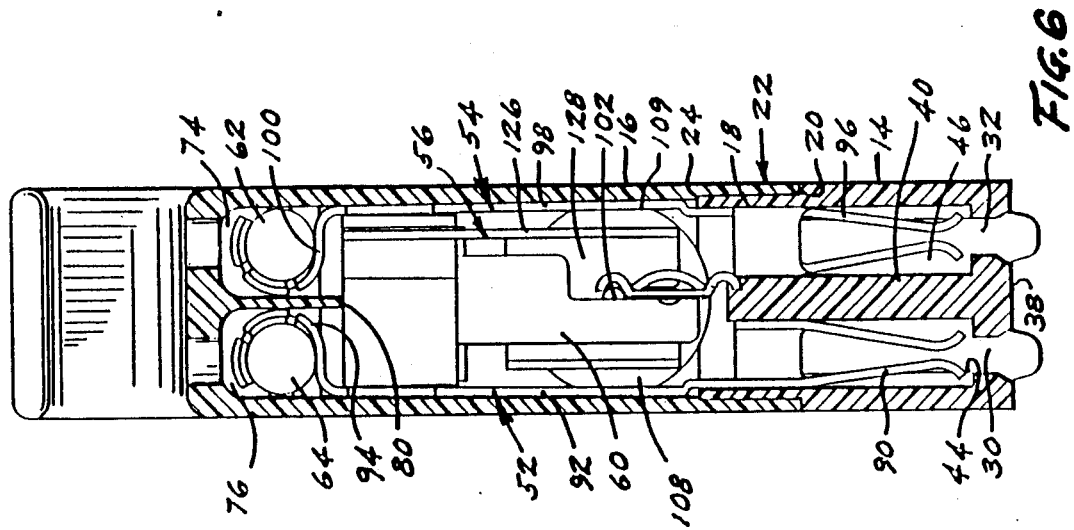
FIG. 7 is an elevation view, partly in cross section, along the line 7—7 of FIG. 1.
Figure 9:
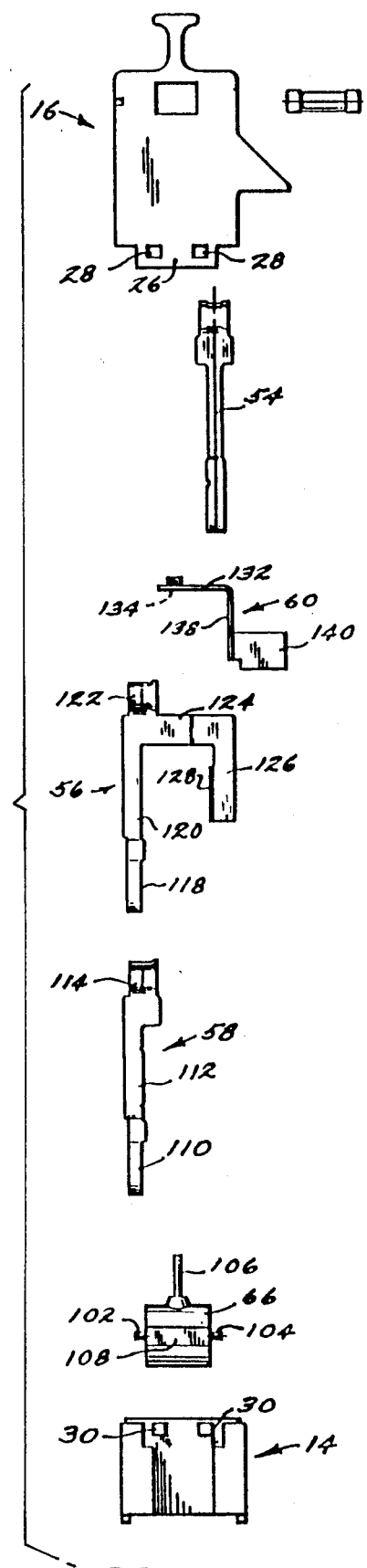
FIG. 9 is an exploded front elevation view of the protector of FIG. 1.
Figure 10:
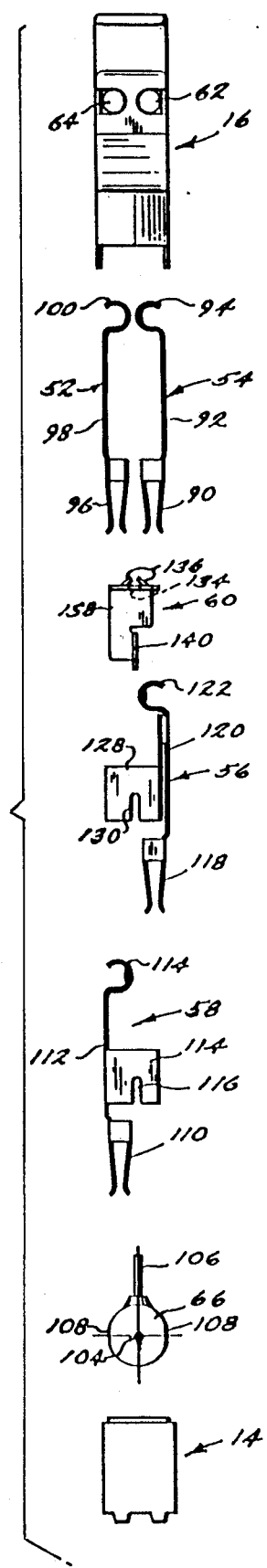
FIG. 10 is an exploded side elevation view of the protector of FIG. 1.

As shown in FIGS. 5 and 6, line contact 52 includes a female connecting portion 90 which resides in lower cavity 44 and is adapted for frictionally mating with a male terminal from a terminal block. Contact 52 further includes an elongated section 92 which terminates at an arcuate connector 94. Arcuate connector 94 is adapted to form a friction fit with an end termination 68 of fuse element 64 in upper cavity 76. Similarly, line contact 54 includes a female connecting portion 96 in lower cavity 46, an elongated central portion 98 and an arcuate terminal connector 100 for frictionally mating with an end termination 68 of fuse element 62.

Surge suppressor 66 is preferably a three element transistor, but may alternatively comprise a three element gas tube or similar device. Suppressor 66 is preferably cylindrical and includes a pair of opposed end rod contacts 102, 104 and a centrally positioned lateral rod contact 106. Surge suppressor 66 is positioned in about the center of housing 12 between lower cavities 44-50 and upper cavities 74, 76. Preferably, the opposed sides of suppressor 66 have flattened surfaces 108 which permit ease of loading between the side walls of housing 12.

Load contact 58 (see FIGS. 5, 7, 9 and 10) includes a female connector 110 which resides in cavity 50. Contact 58 further includes an elongated central member 112 which terminates at an arcuate connector 113 for connecting to an end termination 68 of fuse element 64 in cavity 76 At about the center of elongated member 112 is a transverse flattened extension 114 having a groove 116 formed from the lower portion toward the upper portion. It will be appreciated that groove 116 is configured to frictionally engage and retain surge suppressor rod contact 104 (see FIG. 7) to effect both a mechanical and electrical connection therewith.

Load contact 56 (see FIGS. 4, 6, 7, 9 and 10) has a configuration similar to load contact 58, but includes an extension arm to permit connection with rod contact 102 of suppressor 66. Thus, load contact 56 includes a lower female connector 118 in lower cavity 48, a central elongated member 120 and an upper arcuate connector 122. In addition, a lateral member 124 extends outwardly from member 120 directly below arcuate connector 122. Lateral member 124 has a ninety degree bend and extends downwardly at 126 parallel to member 120. Member 126 then terminates at an extension 128 which is transverse to member 126 and which includes a groove 130 similar to groove 116 in extension 114. Like groove 116 groove 130 is sized to frictionally engage and retain surge suppressor rod contact 102 (see FIG. 6) to effect both a mechanical and electrical connection therewith.

Ground conductor 60 is composed of three planar, mutually transverse sections. A first planar section 132 has a first opening 134 therethrough with a pair of opposed shear tabs 136 which cooperate to frictionally engage and retain central rod contact 106 from surge suppressor 66 to effect both a mechanical and electrical connection therewith. Planar section 132 also has a second opening 133 for receiving an alignment pin 135 which depends from wall 78 A second planar section 138 extends downwardly from section 132 at about ninety degrees and terminates at a third planar section 140 termed a ground contact. Ground contact 140 extends laterally through an opening out of housing 12 so that ground conductor 60 communicates directly between the central rod contact 106 on surge suppressor 66 inside housing 12 and the exterior of housing 12. As will be discussed in more detail hereinafter, ground contact 140 is specially configured to mate with a novel plug-on grounding bus conductor (see FIGS. 12-15).

As is clear in FIG. 2, ground contact 140 has an undulating surface formed therein. This undulating surface makes the effective thickness of contact 140 larger for enhancing electrical connection with bridging clip 154 or other discrete wire means. In addition, this undulating surface adds stiffness. The undulating shape shown in FIG. 2 is particularly advantageous in its ability to mate with certain well known discrete wire connectors.

Housing 12 also includes a triangularly shaped protrusion 200 which extends outwardly from the same side surface of housing 12 as ground contact 140. Protrusion 200 is positioned over ground ContaCt 140 to fully cover the entire ground contact. Protrusion 200 has several important functions In a first function, protrusion 200 acts as an insulative protector to avoid electrical contact with ground 140 or bridge clip 154 (when the unit is fully installed as will be discussed below). The protrusion 200 also functions as a protective barrier to assure that ground contact 140 is not bent or damaged during shipping or handling. Still another important function of protrusion 200 is to provide a means for providing circuit designation This is accomplished by applying appropriate indicia to top planar surface 202 of protrusion 200. Preferably, planar surface 202 is matted to provide a good writing surface.

Figure 11:
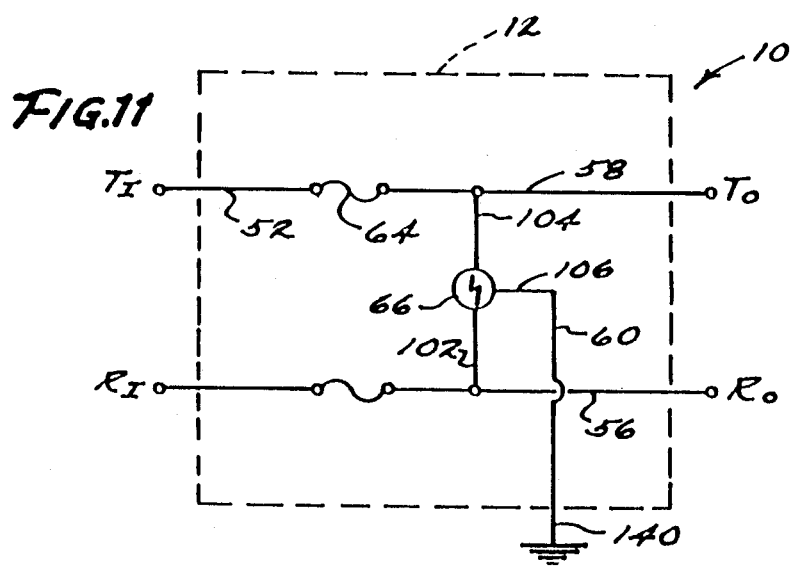
FIG. 11 is a schematic electrical diagram of the protector of FIG. 1.

Referring now to FIG. 11, a schematic diagram of the present invention is shown. During operation, the protector 10 is plugged onto four male terminals from a telephone terminal block. These four terminals correspond to "Tip In" or $T_I$, "Tip Out" or To, "Ring In" or $R_I$ and "Ring Out" or Ro. Line contact 52 is connected to $T_I$ via female connector 90 and line contact 54 is connected to $R_I$ via female connector 96. Load contact 58 is connected to To via female connector 110 and load contact 56 is connected to Ro via female connector 118. Fuse element 62 electrically bridges line contact 54 and load contact 56 while fuse element 64 electrically bridges line contact 52 and load contact 58. In addition, three element surge suppressor 66 electrically communicates between load contacts 56 and 58 while ground connector 60 communicates between surge suppressor 66 within housing 12 and the exterior of housing 12.

It will be appreciated that in the event of a deleterious current overload, fuse elements 62 and 64 will blow thereby breaking the circuit between $T_I$ and To and between $R_I$ and Ro. Similarly, in the event of a voltage surge, three element transistor 66 will act like a zener diode to minimize the voltage differential between (1) Tip and Ring, (2) tip and ground, and (3) between ring and ground, in a known manner thereby avoiding damage to any electronic switch or similar equipment down line of the terminal block.

Turning now to FIGS. 12-16, an important feature of the present invention is a novel ground bus conductor 142 for plug-on connection to a plurality of protective devices 10. Grounding bus 142 comprises an elongated plastic housing 144 having a plurality of slotted apertures 146 evenly spaced therealong. Each aperture 146 is accessible from both a side surface 148 of housing 144 and the top surface 150 of housing 144. The interior of hOusing 144 is defined by an elongated cavity 152 which houses a plurality of bridge clips 154. A bridge clip 154 is positioned in each aperture 146. Each bridge clip 154 has a well known construction which is genially U-shaped, the opposed sides of the U converging to a point and then diverging outwardly. This diverging section is positioned in aperture 146 to face outwardly toward sidewall 148. The bridge clips 154 are all electrically interconnected by a rod 156 which passes through the top of each bridge clip. Thus, all of the bridge clips 154 are electrically interconnected so that ground conductor housing 144 functions as a bus connector. The connection between bridge clip 154 and rod 156 is clearly shown and described in U.S. Pat. No. 4,029,376, assigned to the assignee hereof, all of the contents of which are incorporated herein by reference.

Each bridge clip 154 includes an opening 155 through at least one sidewall for receiving a corresponding detent bump 157 on blade 140 of ground contact 60 see FIGS. 1 and 5). This bump 157/opening 155 structure provides a physical means of insuring that the ground contact 140 is properly installed in bus connector 142 Each bridge clip 154 also includes a pair of lead-in extensions 159 which are used as alignment means with ground contact 140 when protection module 10 is plugged in from the vertical direction as will be discussed below.

At four locations along side 158 of housing 144 are receptacles 160 for accessing bussing rod 156. Each receptacle 160 includes a cavity having plug 162 extending therein which is connected to rod 156. It will be appreciated that a suitable male element (not shown) will mate with plug 162 in receptacle 160 to connect each protective device 10 to a remote ground. Each receptacle 160 also includes at least one lateral wing 161 for effecting wire or cable management; the wings acting to retain wires or cables in the space defined between each wing and side surface 158 of housing 144.

Figure 17:
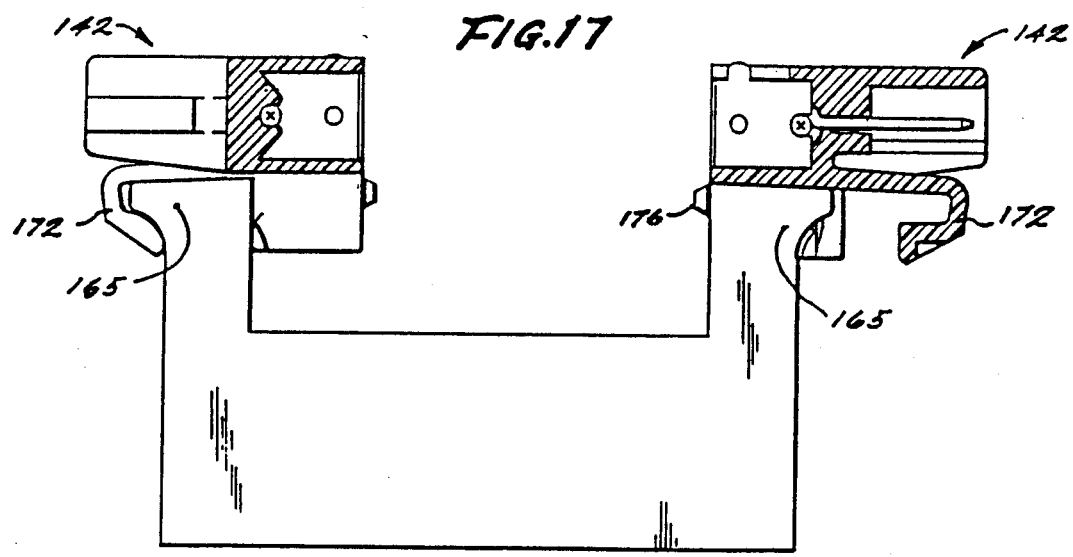
FIG. 17 is a side elevation view showing a pair of grounding bus connectors mounted on a terminal block.

Ground bus connector 142 utilizes a novel system for attachment to a terminal block of the type which incorporates an integral fanning strip along opposed sides thereof such as the 66-type connector block shown at 164 in FIGS. 17, 18 and 19 and depicting opposed fanning strips 165. It will be appreciated that each fanning strip 165 includes adjacent resilient members 170 which define an opening therebetween which is analogous to the bottom half of an hour glass; that is, adjacent top portions of each I-shaped member 170 are spaced closely together whereupon the spacing increases as the members diverge from each other. Bus connector 142 includes depending elements 166 which have a complimentary hour glass configuration with the narrow center being slightly larger than the spacing between members 170 so that elements 166 will form a tight friction fit when slid laterally between the resilient members 170. Associated with each pair of depending elements 166 is a U-shaped stop 172. U-shaped stop 172 is located between an adjacent pair of elements 166 and extends outwardly from side 158 of housing 144. Referring to FIG. 17, grounding bus connector 142 is designed to be mounted in either one of two positions. In a first position shown at the right hand side of FIG. 17, members 166 have been received in fanning strip 165 such that bus conductor 142 is flush with the fanning strip. In the second position shown in the left hand side of FIG. 17 bus conductor 142 has been mounted such that stop 172 engages and is held by the fanning strip.

A first locking means consisting of the structural items shown at 174 and 176 in FIGS. 16-19 is provided to lock bus connector 142 in place after being installed on the fanning strip in the first position Locking means 174 comprises an arcuate stop 180 extending laterally from a tab 178 connected to the lower surface of housing 144. Stop 180 is configured to rest in the curved section of member 170 and prevent bus connector 142 from being raised upwardly during withdrawal of the protector 10 (see FIG. 19). Locking means 176 comprises a pair of spaced hooked extensions which are mounted on depending members 166. Hooked extensions 176 will snap lock with resilient fanning strip members 170 after bus connector 142 has been slidably mounted onto the connecting block in the first position; and thereby prevent withdrawal. Together, locking means 174 and 176 prevent movement of bus connector 142 in lateral, transverse and vertical directions.

Figure 16:
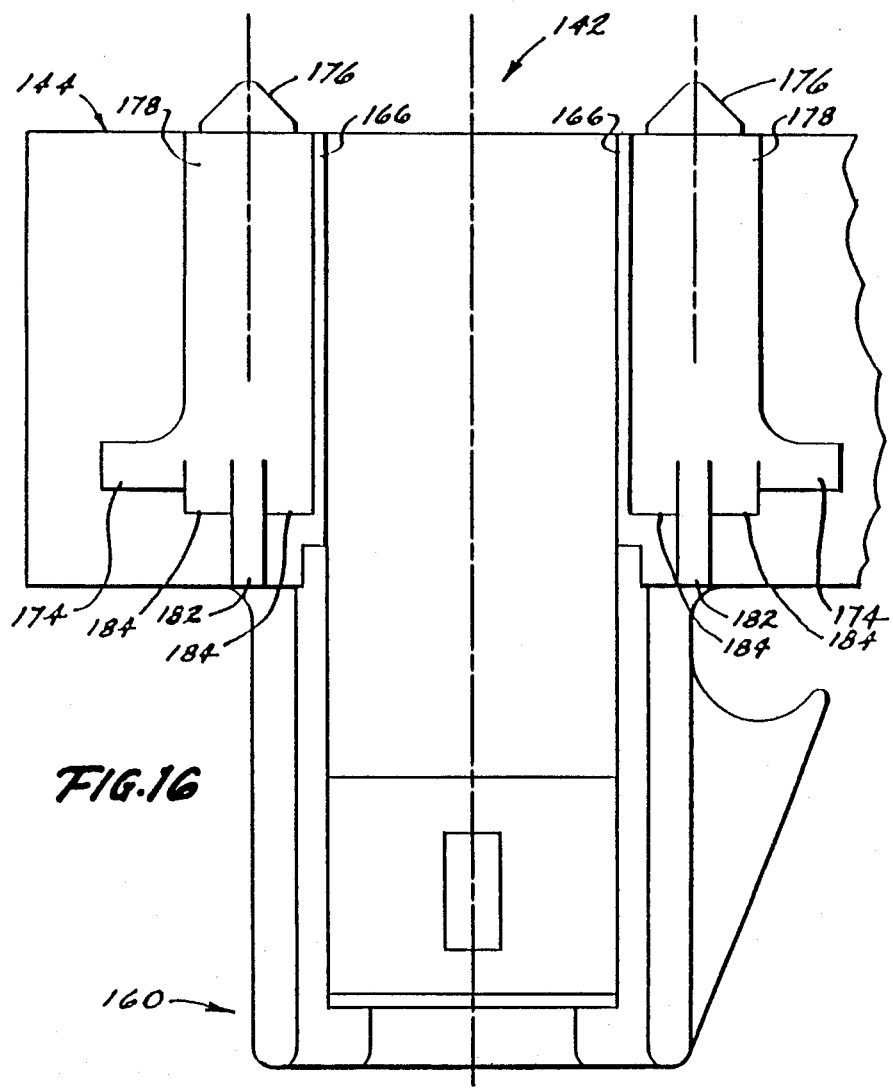
FIG. 16 is a bottom view of a portion of the bus connector of FIG. 12.

The ground bus connector 142 also includes a second locking means which utilizes tabs 178. This second locking means takes effect when bus connector 142 is in the second position shown in the left hand side of FIG. 17. In this latter position, bus connector 142 is angled toward the fanning strip such that stops 172 will receive the contoured backs of the fanning strip. Next, connector 142 is pivoted downwardly whereupon stop 172 is slightly displaced to provide a tight fit with fanning strip 165. Simultaneously, tabs 178 will be lowered so as to straddle between rows of terminals 180. When ground connector 142 is fully seated as shown in FIG. 17, the rearward surface 182 of tab 178 will prevent lateral withdrawal of connector 142. Also, a small step 184 is provided on each side of tabs 178 as shown in FIG. 16. Steps 184 will interlock with the top portions of resilient members 170 to prevent vertical withdrawal of connector 142.

Referring again to FIG. 17, it will be appreciated that the first connection position (right hand side) of ground bus connector 142 will permit connection with a protector module when the protector module is connected to the two outermost rows of terminals (as in FIG. 19) in a terminal block. The second connection position (left hand side) of ground bus connector 142 will permit connection with the second and third outermost rows of terminals in a terminal block. Thus, the difference in spacing between the first and second positions is equivalent to the spacing of a column of terminals on a connector block such as a 66-type connector block.

During installation, ground bus connector 142 is mounted onto fanning strip 165 in either the first or second position depending upon which rows of terminals protector units 10 are to be mounted FIGS. 18 and 19 depict the situation where protector 10 is mounted on the first two rows of terminals.

An important feature of the present invention is that protector 10 may be inserted onto ground bus connector 142 either before or after ground bus connector 142 has been installed on the fanning strip. This feature is permitted by the inclusion of slots 146 along the top surface 150 of connector 142 Also, lead-in ramps 159 on each bridge clip ease receipt of ground contacts 140 through the slots 146 on the surface of connector 142. As is shown in FIG. 19, after installation, protrusion 200 will provide a protective surface to ground contact 140 and bridge clip 154.

In certain circumstances, it may be desirable to use other discrete electronic components in place of fuse elements 62 and 64 as discussed in U S. Application Ser. No. 115,531, which has been incorporated herein by reference. Such components could include, for example, capacitors or resistors. Alternatively, a conductive rod could be used in place of fuse elements 62 and 64. In this latter case, the protective device of this invention would provide only transient voltage protection and no protection from current surges.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A bus connector for mounting on a fanning strip of a terminal block, the fanning strip comprising a plurality of spaced resilient I-shaped members comprising:
   an elongated insulative housing having opposed first and second side surfaces and opposed upper and lower surfaces;
   a plurality of spaced apertures in said insulative housing, each of said apertures extending through at least a portion of said first side surface and said upper surface;
   a plurality of discrete connector clips in said housing, one connector clip being respectively aligned with one of said spaced apertures;
   connecting rod means in said housing, said connecting rod means electrically Connecting each of said discrete connector clips;
   at least one receptacle means extending from said housing, said receptacle means being electrically connected to said rod means to provide access to said rod means; and
   mounting means for mounting said housing to the resilient I-shaped members of the fanning strip of a terminal block.

2. The device of claim 1 wherein each of said resilient I-shaped members of said fanning strip have an upper portion and wherein said mounting means comprises:
   spaced pairs of depending elements extending from said lower surface which are slidably received between adjacent resilient I-shaped fanning strip members;
   stop means having a shape complimentary to the shape of said upper portion of a resilient fanning strip member, said stop means preventing upward movement of said housing; and
   detent means on said depending elements, said detent means snap locking to the resilient members of the fanning strip to prevent lateral withdrawal of said housing.

3. The device of claim 2 wherein:
   said stop means has an arcuate configuration.

4. The device of claim 1 wherein each of said resilient I-shaped members of said fanning strip have an upper portion and wherein said mounting means comprises:
   at least one resilient U-shaped stop extending outwardly from said second side surface, said U-shaped stop having a shape complimentary to the shape of said upper portion of the I-shaped members of the fanning strip;
   at least one tab means depending from said lower surface of said housing, said tab being sized to be received between adjacent rows of terminals, said tab means preventing lateral withdrawal of said housing from the fanning strip; and
   detent means on said tab means, said detent means snap locking with the upper portion of I-shaped fanning strip members to prevent upward movement of said housing.

5. The device of claim 1 including:
   a conductive pin connected to said rod means and extending into said receptacle.

* * * * *